US007493982B2

United States Patent
Kurosawa et al.

(10) Patent No.: US 7,493,982 B2
(45) Date of Patent: Feb. 24, 2009

(54) CONTROL DEVICE FOR A FOUR-WHEEL DRIVE VEHICLE

(75) Inventors: Junichi Kurosawa, Tokyo (JP); Kouichi Inoue, Tokyo (JP); Yoshiyuki Tanaka, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 294 days.

(21) Appl. No.: 11/340,157

(22) Filed: Jan. 26, 2006

(65) Prior Publication Data

US 2006/0162981 A1    Jul. 27, 2006

(30) Foreign Application Priority Data

Jan. 26, 2005    (JP) .............................. 2005-018804

(51) Int. Cl.
B60K 17/344    (2006.01)
(52) U.S. Cl. ...................... 180/248; 180/249; 180/250; 180/247
(58) Field of Classification Search ................ 180/248, 180/197, 247, 233, 249, 250
See application file for complete search history.

(56) References Cited

U.S. PATENT DOCUMENTS

| 5,036,940 | A | * | 8/1991 | Takemura ................... 180/249 |
| 5,152,362 | A | * | 10/1992 | Naito ........................ 180/248 |
| 5,183,131 | A | * | 2/1993 | Naito ........................ 180/233 |
| 5,376,868 | A | * | 12/1994 | Toyoda et al. ............... 318/587 |
| 5,456,641 | A | * | 10/1995 | Sawase ....................... 475/86 |
| 5,897,601 | A | * | 4/1999 | Suzuki ........................ 701/78 |
| 6,059,067 | A | * | 5/2000 | Shibahata et al. ........... 180/338 |
| 6,076,033 | A | * | 6/2000 | Hamada et al. ............... 701/70 |
| 6,131,054 | A | * | 10/2000 | Shibahata ...................... 701/1 |
| 6,216,081 | B1 | * | 4/2001 | Tabata et al. .................. 701/87 |
| 6,491,126 | B1 | * | 12/2002 | Robison et al. ............. 180/233 |
| 6,493,622 | B1 |   | 12/2002 | Erban |

(Continued)

FOREIGN PATENT DOCUMENTS

DE    10235377 A1    2/2004

(Continued)

OTHER PUBLICATIONS

European Patent Search Report for European Patent Application 06075153.4, dated Jan. 5, 2007.

Primary Examiner—Paul N. Dickson
Assistant Examiner—Tashiana Adams
(74) Attorney, Agent, or Firm—Haynes and Boone, LLP

(57) ABSTRACT

A control device for a four-wheel drive vehicle, including: a yaw moment control unit for selecting and applying to a wheel based on a driving state a braking force to generate vehicular yaw moment; a driving force control unit for identifying and reducing excess driving force based on the driving state; a limited slip differential control unit for limiting a front wheel differential; a front/rear driving force distribution control unit for controlling engagement torque of a clutch unit which varies front/rear torque distribution via a center differential; and a switch unit for selecting an operation/non-operation of the driving force control unit, wherein the front/rear driving force distribution control unit sets the engagement torque at a greater value when the yaw moment control unit operates while the driving force control unit is non-operating, than when the yaw moment control operates while the driving force control unit is operating.

4 Claims, 5 Drawing Sheets

U.S. PATENT DOCUMENTS

| | | | |
|---|---|---|---|
| 6,810,983 B2 * | 11/2004 | Matsuno | 180/249 |
| 7,328,955 B2 * | 2/2008 | Tsukasaki | 303/190 |
| 2001/0002628 A1 * | 6/2001 | Yasuda | 180/197 |
| 2004/0026148 A1 * | 2/2004 | Matsuno | 180/248 |

FOREIGN PATENT DOCUMENTS

| | | | |
|---|---|---|---|
| EP | 1197410 | A2 | 4/2002 |
| EP | 1400390 | A2 | 3/2004 |
| JP | 2003776 | A | 1/1990 |
| JP | 4103847 | A | 4/1992 |
| JP | 5296076 | A | 11/1993 |
| JP | 2004-106649 | | 4/2004 |
| JP | 2004106649 | A | 4/2004 |
| WO | 200128802 | A1 | 4/2001 |

\* cited by examiner

CONTROL DEVICE FOR A FOUR-WHEEL DRIVE VEHICLE

CROSS REFERENCE TO RELATED APPLICATIONS

This application claims priority under 35 U.S.C. 119 based upon Japanese Patent Application Serial No. 2005-018804, filed on Jan. 26, 2005. The entire disclosure of the aforesaid application is incorporated herein by reference.

BACKGROUND OF THE INVENTION

1. Field of the Invention

The present invention relates to a control device for a four-wheel drive vehicle, comprising yaw moment control for generating yaw moment on the vehicle, driving force control for suppressing excess driving force, and limited slip differential control for limiting differential motion between the right and left wheels.

2. Description of the Related Art

Four-wheel drive vehicles manufactured in recent years are equipped with a number of vehicle behavior control devices such as yaw moment control for generating yaw moment on the vehicle, driving force control (traction control) for suppressing excess driving force, limited slip differential control (LSD control) for limiting differential motion between the right and left wheels, and the like. Since these controls often interfere with each other, a wide variety of techniques have been developed and utilized in order for these controls to effectively work together to their full potential.

For example, Japanese Laid-open Publication 2004-106649 discloses a technique wherein transfer clutch torque is adjusted to be small enough to avoid the interference of the behavior controls such as the yaw moment control, the traction control, or the ABS (Anti-lock Brake System) operation in a four-wheel drive vehicle where the driving force is distributed between front and rear axles by, instead of a center differential, a transfer clutch that can vary the transfer capacity. The entire disclosure of the aforesaid publication is incorporated herein by reference.

For example, when the yaw moment control operates to prevent an over-steering tendency, the braking force is applied to the front wheel located at the outer side of turning. In this case, the braking force due to the limited slip differential control is applied to the front wheel located at the inner side of the turning, because a difference in wheel velocity has been generated between the right and left front wheels. While the cornering force generated by the front tires is maintained owing to the braking forces applied to the two front wheels, the driving force is transferred to the two rear wheels. If the traction control via a switch means is effective, the engine control prevents the transfer of excess driving force to the two rear wheels. However, if the traction control is not effective, the driving force is excessively transferred to the two rear wheels so that the cornering force generated by the rear tires tends to decrease. As a result, the yaw moment along the same direction as the vehicle's yaw moment is generated because of the reduction in the cornering force at the two rear wheels while the cornering force at the two front wheels is being maintained. Thus, the over-steering tendency cannot be prevented after all. In this case, if a transfer clutch that can vary the transfer capacity is used for the driving force distribution instead of a center differential, as disclosed in the aforesaid Japanese Laid-open publication 2004-106649, it is possible to reduce the torque transfer from the front wheels to the rear wheels by reducing the transfer clutch torque, thereby preventing the interference of the yaw moment control with the rear wheels. However, in the center differential mechanism wherein the torque distribution between the front and rear axles is controlled by means of a clutch that can vary the transfer capacity, reducing the engagement torque of the clutch may permit the transfer of excess driving force to the rear wheels, likely to cause unstable vehicle behaviors.

SUMMARY OF THE INVENION

In view of the above circumstances, the object of the present invention is to provide a control device for a four-wheel drive vehicle for suppressing the transfer of excess driving force to the rear wheels so as to maintain the vehicle behavior stability even when the traction control is not effective.

According to the present invention, there is provided a control device for a four-wheel drive vehicle, comprising: a yaw moment control unit for selecting a wheel based on a driving state and generating yaw moment on the vehicle by applying braking force to the selected wheel; a driving force control unit for identifying excess driving force based on the driving state and reducing the identified excess driving force; a limited slip differential control unit for limiting a differential between a front right wheel and a front left wheel; a front and rear driving force distribution control unit for controlling engagement torque of a clutch unit which varies torque distribution between front and rear axles via a center differential; and a switch unit for selecting an operation state or a non-operation state of the driving force control unit, wherein the front and rear driving force distribution control unit sets the engagement torque of the clutch unit at a value when the yaw moment control unit operates while the driving force control unit is in the non-operation state, the value being greater than that of the engagement torque of the clutch unit when the yaw moment control operates while the driving force control unit is in the operation state.

By use of the control device for a four-wheel drive vehicle according the present invention, it is possible to maintain vehicle behavior stability since the transfer of excess driving force to the rear wheels is suppressed even when the traction control is not effective.

Those skilled in the art will appreciate these and other advantages and benefits of various embodiments of the invention upon reading the following detailed description of the preferred embodiments with reference to the below-listed drawings.

DETAILED DESCRIPTION OF THE PREFERRED EMBODIMENTS

Embodiments of the present invention are described below with reference to the accompanying drawings to facilitate understanding of the present invention.

Figure 1:
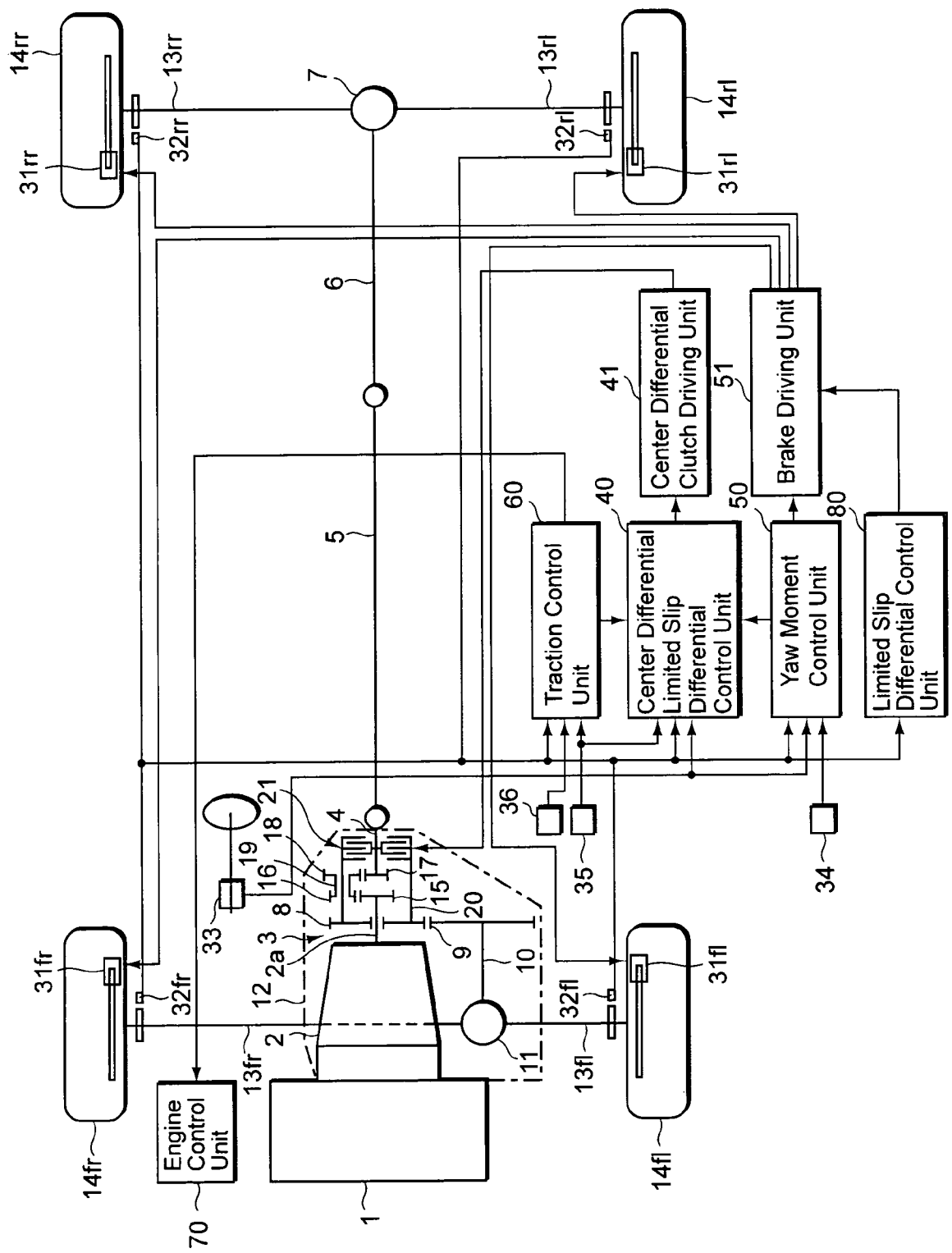
FIG. 1 is an explanatory diagram showing the schematic structure of the vehicle provided with a plurality of behavior control units.

In FIG. 1, the reference numeral 1 refers to an engine mounted on the front of a vehicle. The driving force generated by the engine 1 is transmitted through an automatic transmission system 2 (shown including a torque converter and other parts) in the rear of the engine and through a transmission output axle 2a to a center differential system 3.

The driving force transmitted to the center differential system 3 is inputted to a rear wheel final reduction device 7 through a rear drive axle 4, a propeller shaft 5, and a drive pinion axle, as well as to a front wheel final reduction device 11 through a transfer drive gear 8, a transfer driven gear 9, and a front drive axle 10 which serves as a drive pinion axle. The automatic transmission system 2, the center differential system 3, and the front wheel final reduction device 11 are housed in a case 12.

The driving force transmitted to the rear wheel final reduction device 7 is further transmitted to a left rear wheel 14rl through a left rear wheel drive axle 13rl as well as to a right rear wheel 14rr through a right rear wheel drive axle 13rr. Similarly, the driving force transmitted to the front wheel final reduction device 11 is further transmitted to a left front wheel 14fl through a left front wheel drive axle 13fl as well as to a right front wheel 14fr through a right front wheel drive axle 13fr.

The center differential system 3 includes a first sun gear 15 with a large diameter at the transmission output axle 2a, the first sun gear 15 engaged with a first pinion 16 with a small diameter to form a first gear array.

At the rear drive axle 4, a second sun gear 17 with a small diameter is provided, the second sun gear 17 engaged with a second pinion 18 with a large diameter to form a second gear array.

First and second pinions 16 and 18 are integrally formed on a pinion section 19, a plurality of which (three, for example) are rotatably supported at a fixed shaft provided for a carrier 20. At the front end of the carrier 20, the transfer drive gear 8 is attached for outputting the driving force to the front wheels.

The transmission output axle 2a is rotatably inserted into the carrier 20 from the front, and the rear drive axle 4 is rotatably inserted into the carrier 20 from the rear. In the space between the two, the first sun gear 15 and the second sun gear 17 are housed. The first and second pinions 16 and 18 at each pinion section 19 are engaged with the first and second sun gears 15 and 17, respectively.

As seen above, compound planetary gears without ring gears are provided with respect to the first sun gear 15 at the input side with one output side through the first and second pinions 16 and 18 and the second sun gear 17, and the other output side through the carrier 20 having the first and second pinions 16 and 18.

The center differential system 3 with such compound planetary gears is made to exhibit a differential function by properly setting the number of teeth of the first and second sun gears 15 and 17, as well as of the plurality of the first and second pinions 16 and 18 surrounding the sun gears 15 and 17.

Furthermore, a standard torque distribution (for example, an unequal torque distribution with more torque on the rear wheels) can be predetermined by properly setting the pitch radii of the engagement between the first and second pinions 16 and 18 and the first and second sun gears 15 and 17, respectively.

In the center differential system 3, helix gears, for example, may be used for the first and second pinions 16 and 18 and the first and second sun gears 15 and 17, and the torsion angle may be made different between the first and second gear arrays so as not to cancel the thrust load of each other. Furthermore, the force generated by combining the separation load and the tangential load, acting on the engagement point on the surface of the fixed shaft provided for the carrier 20 and the first and second pinions 16 and 18, is made to act on both ends of the pinion section 19 so as to generate friction torque thereon. The center differential system 3 is made to exhibit a limited slip differential function by obtaining the limited slip differential torque to be proportional to the input torque.

A center differential clutch 21 is provided between the two output sections of the center differential system 3, i.e. the carrier 20 and the rear drive axle 4. A hydraulic multi-board clutch is employed for the center differential clutch 21, which variably controls the driving force distribution between the front and rear axles. By controlling the engagement torque of the center differential clutch 21, it is possible to vary the torque distribution ratio between the front and rear wheels from 50:50 representing a four-wheel drive with directly connected front and rear wheels to the value (35:65, for example) set by the center differential system 3.

The center differential clutch 21 is connected to a center differential clutch driving unit 41, which comprises a hydraulic circuit with a plurality of solenoid valves. Engagement and release of the clutch are controlled by the hydraulic pressure generated at the center differential clutch driving unit 41. The control signal for driving the center differential clutch driving unit 41 (a signal to each solenoid valve) is outputted from a center differential limited slip differential control unit 40, which is described later.

The reference numeral 51 refers to a brake driving unit, which is connected to a master cylinder (not shown in the figure) connected to a brake pedal operated by the driver. When the driver operates the brake pedal, the master cylinder applies brake pressure via the brake drive unit 51 to wheel cylinders 31fl, 31fr, 31rl, and 31rr of wheels 14fl, 14fr, 14rl, and 14rr, respectively, for braking the four wheels. The brake driving unit 51 is a hydraulic unit equipped with a source for applying pressure, a valve for reducing pressure, a valve for increasing pressure, and the like. Brake pressure can be individually applied to each of the wheel cylinders 31fl, 31fr, 31rl, and 31rr according to the input signals from a yaw moment control unit 50 and a limited slip differential control unit 80, which are described later, in addition to the driver's brake operation as above.

The yaw moment control unit 50 is provided as a yaw moment control means, which performs automatic brake control as below based on, for example, the wheel velocity obtained by each of wheel velocity sensors 32fl, 32fr, 32rl, and 32rr, the steering angle obtained by a steering angle sensor 33, the yaw rates obtained by a yaw rate sensor 34, and so on.

The differential value of a target yaw rate, the differential value of an expected yaw rate during running on a low-μ road, and the difference between the two differential values as well as the difference between the actual and target yaw rates are computed. Based on these values, target braking force for correcting an under-steering tendency or an over-steering tendency is computed. The yaw moment control unit 50 outputs a control signal to the brake drive unit 51 to apply the target braking force to a selected wheel for the yaw moment control. The selected wheel is a rear wheel located at the inner side of turning if the under-steering tendency needs to be corrected, and it is a front wheel located at the outer side of turning if the over-steering tendency needs to be corrected. The signal indicating operation or non-operation of the yaw moment control unit 50 is also outputted to the center differential limited slip differential control unit 40.

The reference numeral 60 refers to a traction control unit as a driving force control means, which detects a slip rate of each wheel based on signals from an accelerator open degree sensor 36 and the wheel velocity sensors 32fl, 32fr, 32rl, and 32rr. When the slip rate becomes greater than or equal to a predetermined judgment value while the acceleration open degree becomes greater than or equal to 0, the traction control 60 outputs a control signal to an engine control unit 70 to perform various controls such as fuel emission control so as to decrease the torque of the engine 1. The signals indicating operation or non-operation of the traction control unit 50 are also outputted to the center differential limited slip differential control unit 40.

A traction control OFF switch 35 is provided as a switch means, and is connected to the traction control unit 60, enabling the driver to select between operation and non-operation of the traction control. The signals from the traction control OFF switch 35 are also outputted to the center differential limited slip differential control unit 40.

The reference numeral 80 refers to the limited slip differential (LSD) control unit as a limited slip differential means, which computes the difference in velocity between the right and left wheels at each of the front and rear based on the signals from the wheel velocity sensors 32fl, 32fr, 32rl, and 32rr, determines the target braking force according to the absolute value of the difference, and outputs a signal to the brake drive unit 51 to apply the target braking force to the wheel of a greater wheel velocity.

Inputs to the center differential limited slip differential control unit 40 are: the wheel velocities ωfl, ωfr, ωrl, and ωrr from the wheel velocity sensors 32fl, 32fr, 32rl, and 32rr, respectively, the steering angle from the steering angle sensor 33, the selected state of the traction control from the traction control OFF switch 35, the operation or non-operation state of the yaw moment control from the yaw moment control unit 50, and the operation or non-operation state of the traction control from the traction control unite 60.

Based on these inputs, when the yaw moment control or the traction control is executed while the operation state of the traction control is selected by the traction control OFF switch 35, a predetermined constant TCL is set as a front and rear limited slip differential torque Tlsdctr. On the other hand, when the yaw moment control is executed while the non-operation state of the traction control is selected by the traction control OFF switch 35, a predetermined constant TCH which is larger than the above TCL is set as the front and rear limited slip differential torque Tlsdctr. In the cases other than the above, the front and rear limited slip differential torque Tlsdctr, which was computed based on the actual differential rotation frequency between the front and rear axles and the target differential rotation frequency, is set as the front and rear limited slip differential torque Tlsdctr. The limited slip differential force corresponding to the front and rear limited slip differential torque Tlsdctr determined as above is outputted to the center differential clutch driving unit 41 to control the engagement torque of the center differential clutch 21.

Figure 2:
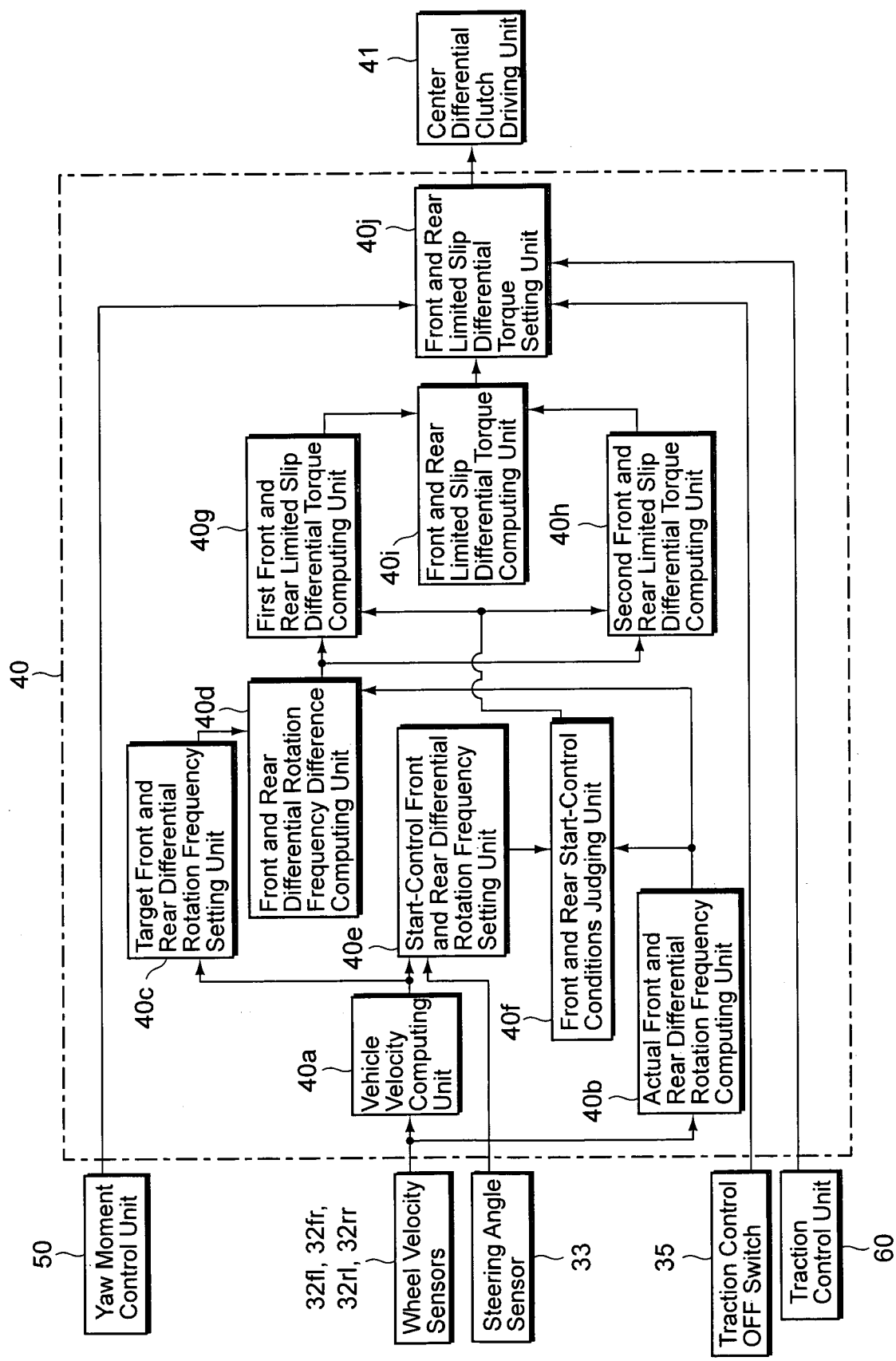
FIG. 2 is a functional block diagram of the center differential limited slip differential control unit.

The center differential limited slip differential control unit 40 is provided as a front and rear driving force distribution control means, comprising, as shown in FIG. 2, a microcomputer and its peripherals, a vehicle velocity computing unit 40a, an actual front and rear differential rotation frequency computing unit 40b, a target front and rear differential rotation frequency setting unit 40c, a front and rear differential rotation frequency difference computing unit 40d, a start-control front and rear differential rotation frequency setting unit 40e, a front and rear start-control conditions judging unit 40f, a first front and rear limited slip differential torque computing unit 40g, a second front and rear limited slip differential torque computing unit 40h, a front and rear limited slip differential torque computing unit 40i, and a front and rear limited slip differential torque setting unit 40j.

The wheel velocity sensors 32fl, 32fr, 32rl, and 32rr input the wheel velocities ωfl, ωfr, ωrl, and ωrr of the wheels 14fl, 14fr, 14rl, and 14rr, respectively, into the vehicle velocity computing unit 40a The vehicle velocity V is obtained by taking the average of these four values, for example, and is outputted to the target front and rear differential rotation frequency setting unit 40c and the start-control front and rear differential rotation frequency setting unit 40e.

The wheel velocity sensors 32fl, 32fr, 32rl, and 32rr input the wheel velocities ωfl, ωfr, ωrl, and ωrr of the wheels 14fl, 14fr, 14rl, and 14rr, respectively, into the actual front and rear differential rotation frequency computing unit 40b, which computes the actual front and rear differential rotation frequency Δωctr as in Eq. (1):

$$\Delta \omega ctr = \left| \frac{(\omega fl + \omega fr)}{2} - \frac{(\omega rl + \omega rr)}{2} \right| \tag{1}$$

which is then outputted to the front and rear differential rotation frequency difference computing unit 40d and the front and rear start-control conditions judging unit 40f.

The vehicle velocity computing unit 40a inputs the velocity V into the target front and rear differential rotation frequency setting unit 40c, which determines the target front and rear differential rotation frequency Δωctrt corresponding to the vehicle velocity V by referencing a map showing Δωctrt vs. V obtained in advance through experiments and/or simulations.

Figure 3:
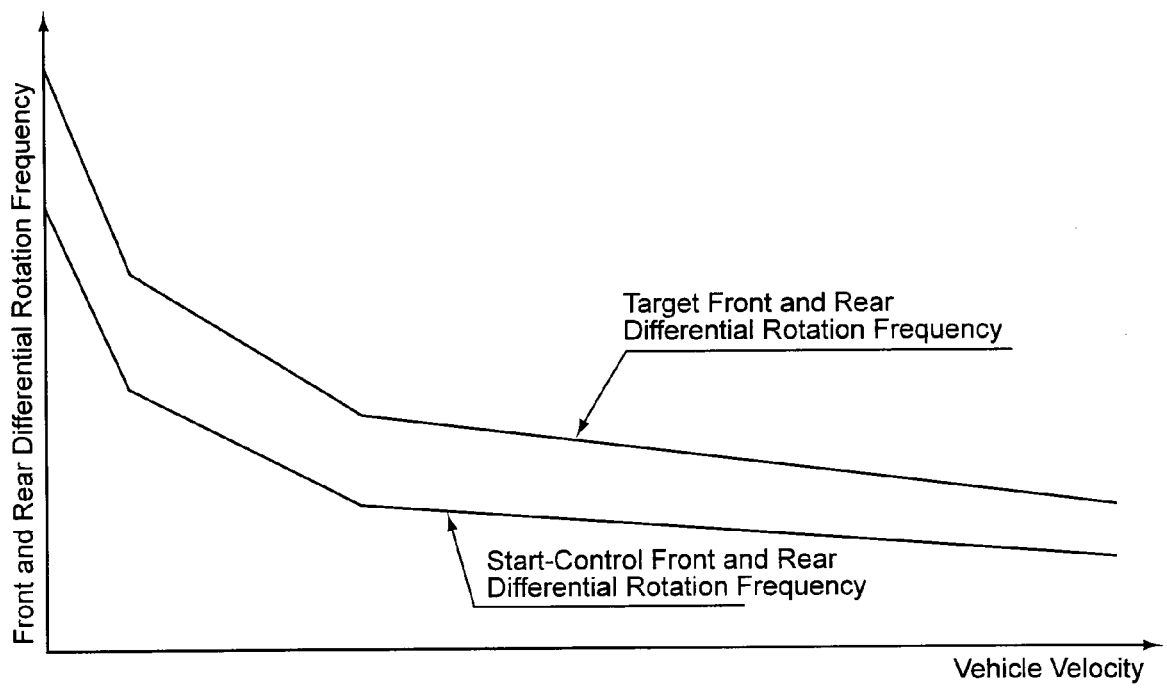
FIG. 3 is an explanatory diagram showing the target front and rear differential rotation frequency and the front and rear differential rotation frequency for starting the control vs. the vehicle velocity.

An example of the map is shown in FIG. 3. The target front and rear differential rotation frequency Δωctrt decreases as the vehicle velocity V increases, and is determined by taking into account various errors during actual running based on a number of factors.

The target front and rear differential rotation frequency setting unit 40c inputs the target front and rear differential rotation frequency Δωctrt into the front and rear differential rotation frequency difference computing unit 40d, and the actual front and rear differential rotation frequency computing unit 40b inputs the actual front and rear differential rotation frequency Δωctr into the front and rear differential rotation frequency difference computing unit 40d. Then, the difference between the two (a front and rear differential rotation frequency difference) εctr is computed as in the following Eq. (2):

$$\epsilon ctr = \Delta \omega ctr - \neq \omega ctrt \tag{2}$$

which is then outputted to the first and second front and rear limited slip differential torque computing units 40g and 40h.

The vehicle velocity computing unit 40a inputs the velocity V into the start-control front and rear differential rotation frequency setting unit 40e, which determines a start-control front and rear differential rotation frequency Δωctrs corresponding to the vehicle velocity V by referencing a map showing Δωctrs vs. V obtained in advance through experiments and/or simulations. An example of the map is shown in FIG. 3. The target front and rear differential rotation frequency Δωctrt decreases as the vehicle velocity V increases, and is determined by taking into account various errors during actual running based on a number of factors.

The start-control front and rear differential rotation frequency Δωctrs is smaller than the target front and rear differential rotation frequency Δωctrt, and serves as the lower limit of the actual front and rear differential rotation frequency Δωctr.

Figure 4:
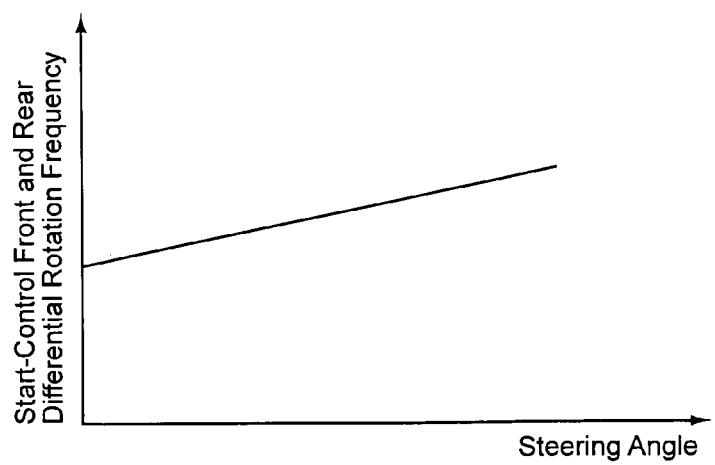
FIG. 4 is an explanatory diagram showing the front and rear differential rotation frequency for starting the control vs. the steering angle.

In the present embodiment, the steering angle sensor inputs the steering angle into the start-control front and rear differential rotation frequency setting unit 40e, which corrects the start-control front and rear differential rotation frequency Δωctrs, which has been determined based on the velocity V, further based on the steering angle for better accuracy. The correction through the steering angle may be carried out by using a map shown in FIG. 4, for example. The larger the steering angle is, the larger the correction of the start-control front and rear differential rotation frequency Δωctrs is.

The actual front and rear differential rotation frequency computing unit 40b inputs the actual front and rear differential rotation frequency Δωctr into the front and rear start-control conditions judging unit 40f, and the start-control front and rear differential rotation frequency setting unit 40e inputs the start-control front and rear differential rotation frequency Δωctrs into the front and rear start-control conditions judging unit 40f. Then, the front and rear start-control conditions judging unit 40f determines if the front and rear conditions for starting the control have been met by comparing Δωctr to Δωctrs.

If Δωctr is greater than Δωctrs, the front and rear start-control conditions judging unit 40f determines that the conditions for starting the control are met, and outputs the judgment result to the first and second front and rear limited slip differential torque computing units 40g and 40h.

Into the first front and rear limited slip differential torque computing unit 40g, the front and rear differential rotation frequency difference ϵctr is inputted from the front and rear differential rotation frequency difference computing unit 40d, and the judgment result is inputted from the front and rear start-control conditions judging unit 40f as to whether the conditions for starting the control are met. Then, the first front and rear limited slip differential torque computing unit 40g computes a first front and rear limited slip differential torque Tsmcctr as shown in Eqs. (3) and (4):

$$sctr = \varepsilon ctr + ki ctr \cdot \int (\varepsilon ctr) dt \quad (3)$$

$$x = k\omega ctr \cdot j\omega ctr \cdot \left(\frac{d(\varepsilon ctr)}{dt}\right) + Tsg ctr \cdot \left(\frac{sctr}{(|sctr| + \delta ctr)}\right) \quad (4)$$

where the integration range is from 0 to t, kωtr is a gain for the integral term, kωctr is a gain for the differential term, jωctr is a moment of inertia, Tsgctr is a switching gain, δctr is a constant for making the limited slip differential force continuous so as to prevent chattering.

If x>0, Tsmcctr=x; and if x≦0, Tsmcctr=0. Based on the judgment result from the front and rear start-control conditions judging unit 40f, if the conditions are not met with Δωctr≦Δωctrs for starting the control, resetting is made so as to have Tsmccrt=0 and ∫ (ϵctr) dt=0 even if Tsmcctr=x in the above.

That is, if the actual front and rear differential rotation frequency Δωctr is smaller than or equal to the start-control front and rear differential rotation frequency Δωctrs, which is the lower limit of Δωctr, the first front and rear limited slip differential torque Tsmcctr is set to be 0 so as to avoid the friction-induced locking state of the center differential clutch 21. Furthermore, resetting the integral ∫ (ϵctr) dt to 0 prevents an abnormally low integral value, which could greatly delay the control when the center differential clutch 21 resumes slipping, resulting in a prolonged stick slip of the clutch. Thereafter, Tsmcctr so obtained is outputted to the front and rear limited slip differential torque computing unit 40i.

The front and rear differential rotation frequency difference computing unit 40d inputs ϵctr into the second front and rear limited slip differential torque computing unit 40h, and the front and rear start-control conditions judging unit 40f inputs the judgment result as to whether the conditions for starting the control are met into the second front and rear limited slip differential torque computing unit 40h. Then, the second front and rear limited slip differential torque computing unit 40h computes a second front and rear limited slip differential torque Tpcctr as follows.

If ϵctr>0, Tpcctr=kpctr·ϵctr; and if ϵctr≦0, Tpcctr=0. Here, kpctr is a gain for the proportional term. Based on the judgment result from the front and rear start-control conditions judging unit 40f, if the conditions are not met with Δωctr≦Δωctrs for starting the control, resetting is made so as to have Tpccrt=0 even if Tpcctr=kpctr·ϵctr in the above in order to avoid a friction-induced locking state of the center differential clutch 21.

The first front and rear limited slip differential torque computing unit 40g inputs Tsmcctr into the front and rear limited slip differential torque computing unit 40i, and the second front and rear limited slip differential torque computing unit 40h inputs Tpcctr into the front and rear limited slip differential torque computing unit 40i. The front and rear limited slip differential torque Tlsdctr is then obtained as in Eq. (5):

$$Tlsdctr = Tsmcctr + Tpcctr \quad (5)$$

which is then outputted to the front and rear limited slip differential torque setting unit 40j.

The front and rear limited slip differential torque Tlsdctr may be computed by the vehicle velocity computing unit 40a—the front and rear limited slip differential torque computing unit 40i as needed by the front and rear limited slip differential torque setting unit 40j, or may be computed in advance and read in as needed by it.

Into the front and rear limited slip differential torque setting unit 40j, the selected state of the traction control is inputted from the traction control OFF switch 35, the operation or non-operation state of the yaw moment control is inputted from the yaw moment control unit 50, and the operation or non-operation state of the traction control is inputted from the traction control unite 60, and Tlsdctr is inputted from the front and rear limited slip differential torque computing unit 40i as needed.

When the yaw moment control or the traction control is executed while the traction control is in the operation state, the predetermined constant TCL (between 0.5-1.0 Nm, for example) is assigned to Tlsdctr.

When the yaw moment control is executed while the traction control is in the non-operation state, the predetermined constant TCH (between 90-110 Nm, for example), which is larger than the above TCL, is assigned to Tlsdctr.

In the other cases than the above two, Tlsdctr from the front and rear limited slip differential torque computing unit 40*i* is directly assigned to Tlsdctr.

The limited slip differential value corresponding to the front and rear limited slip differential torque Tlsdctr determined as above is then outputted to the center differential clutch driving unit 41.

Figure 5:
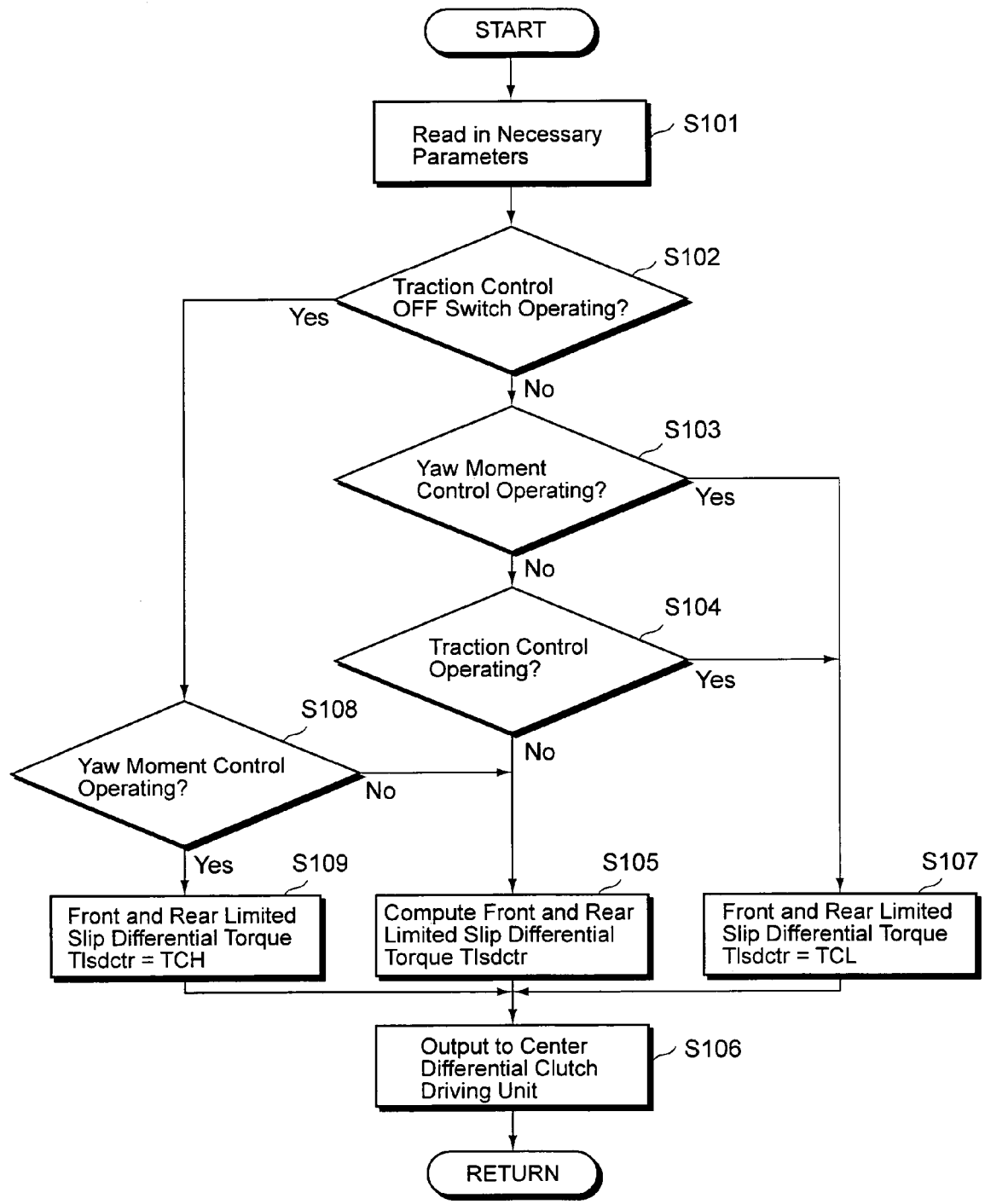
FIG. 5 is a flowchart showing the center differential limited slip differential control program.

The processing flow at the center differential limited slip differential control unit 40 is explained below with reference to the flowchart shown in FIG. 5.

In the step S101, the wheel velocities ωfl, ωfr, ωrl, and ωrr from the wheel velocity sensors 32*fl*, 32*fr*, 32*rl*, and 32*rr*, respectively, the steering angle from the steering angle sensor 33, the selected state of the traction control from the traction control OFF switch 35, the operation or non-operation state of the yaw moment control from the yaw moment control unit 50, the operation or non-operation state of the traction control from the traction control unite 60, and other necessary parameters are read in.

In the step S102, the selected state of the traction control by the traction control OFF switch 35 is judged. If the traction control OFF switch is not operating, that is the operable state of the traction control is selected, the process flow goes to the step S103 where it is determined if the yaw moment control is operating.

If the yaw moment control is not operating, the process flow goes to the step S1104 where it is determined if the traction control is operating. If not, the process flow goes to the step S105.

Figure 6:
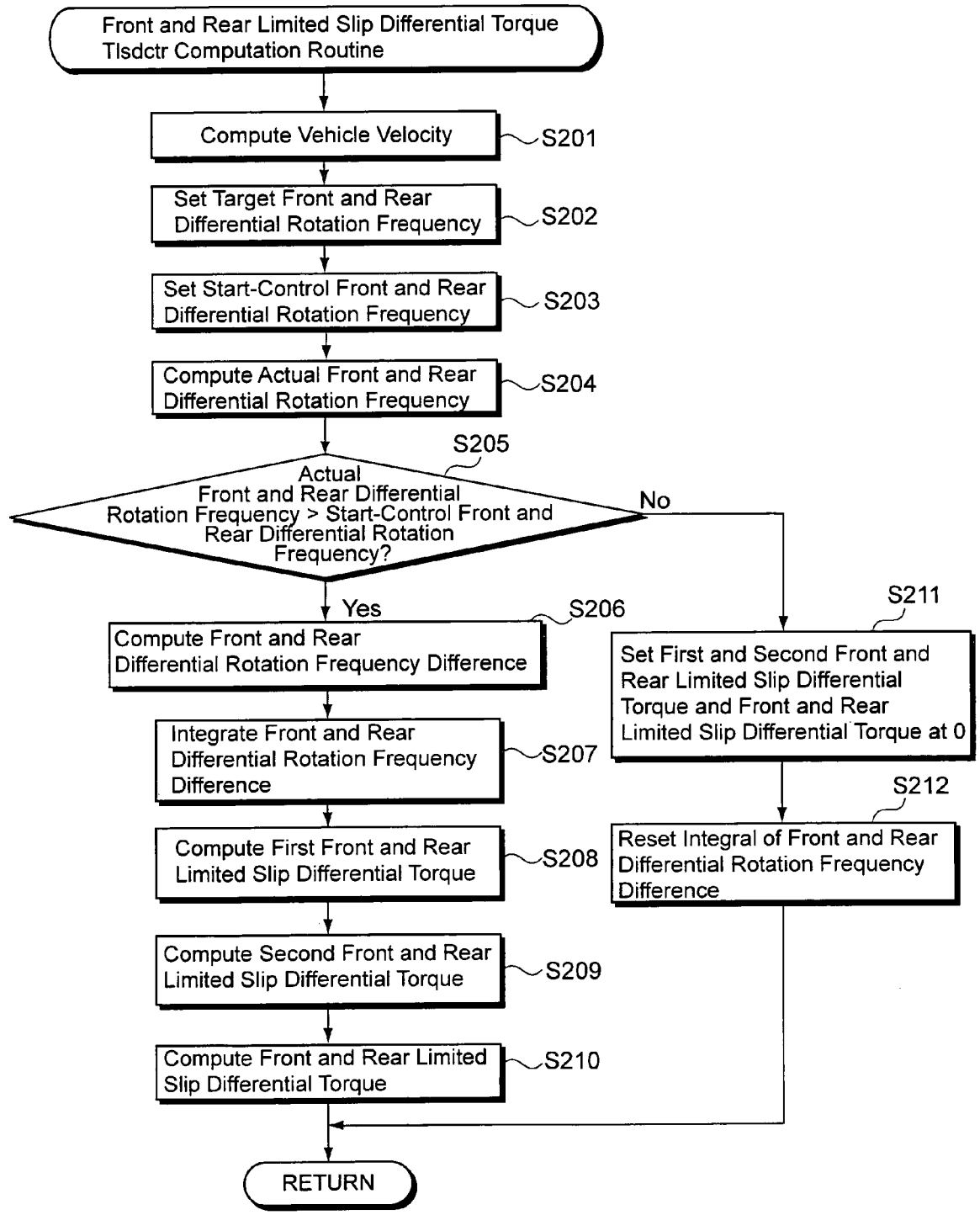
FIG. 6 is a flowchart showing the computation routine for the front and rear limited slip differential torque Tlsdctr.

In the step S105, Tlsdctr is computed via a front and rear limited slip differential torque computation routine, the flowchart of which is shown in FIG. 6. In the step S106, the limited slip differential value corresponding to Tlsdctr obtained at the step S105 is outputted to the center differential clutch driving unit 41, and then the process flow exits the program.

If it is judged that the yaw moment control is operating in the step S103, or the traction control is operating in the step S104, the process flow goes to the step S107 where the predetermined constant TCL is assigned to Tlsdctr (Tlsdctr=TCL). Then, in the step S106, the limited slip differential value corresponding to Tlsdctr set in the step S107 is outputted to the center differential clutch driving unit 41, and then the process flow exits the program.

If it is judged that the traction control OFF switch 35 is operating, that is, the non-operable state of the traction control is selected, the process flow goes to the step S108 where it is determined if the yaw moment control is operating.

If the yaw moment control is not operating, the process flow goes to the step S105 where Tlsdctr is computed via the front and rear limited slip differential torque computation routine, the flowchart of which is shown in FIG. 6. In the step S106, the limited slip differential value corresponding to Tlsdctr obtained at the step S105 is outputted to the center differential clutch driving unit 41, and then the process flow exits the program.

On the other hand, if the yaw moment is operating, the process flow goes to the step S109 where the predetermined constant TCH, which is larger than the above TCL, is assigned to Tlsdctr (Tlsdctr=TCH). Then, in the step S1106, the limited slip differential value corresponding to Tlsdctr obtained at the step S109 is outputted to the center differential clutch driving unit 41, and then the process flow exits the program.

FIG. 6 shows the flowchart of the front and rear limited slip differential torque computation routine, which is executed in the above step S105. Specifically, this figure explains how Tlsdctr is computed by the vehicle velocity computing unit 40*a*—the front and rear limited slip differential torque computing unit 40*i*, which are shown in the block diagram in FIG. 2. Incidentally, the process shown in this flowchart may be initiated upon receiving a trigger signal from the front and rear limited slip differential torque setting unit 40*j*, or may be routinely executed.

In the step S201, the vehicle velocity V is computed by the vehicle velocity computing unit 40*a*. In the step S202, the target front and rear differential rotation frequency Δωctrt corresponding to V is determined by the target front and rear differential rotation frequency setting unit 40*c* based on the map showing Δωctrt vs. V.

In the step S203, the start-control front and rear differential rotation frequency Δωctrs is determined by the start-control front and rear differential rotation frequency setting unit 40*e* based on the map showing Δωctrs vs. V with the steering angle correction.

In the step S204, the actual front and rear differential rotation frequency Δωctr is computed by the actual front and rear differential rotation frequency computing unit 40*b* based on Eq. (1).

In the step S205, Δωctr and Δωctrs are compared to each other by the front and rear start-control conditions judging unit 40*f*. If Δωctr is greater than Δωctrs, it is judged that the front and rear conditions for starting the control are met, and then the process flow goes to the step S206.

In the step S206, the front and rear differential rotation frequency difference εctr is computed by the front and rear differential rotation frequency difference computing unit 40*d* based on Eq. (2), and then the process flow goes to the step S207.

In the step S207, the integration of εctr, i.e. $\int (\epsilon ctr) dt$, from t=0 to t=t is carried out by the first front and rear limited slip differential torque computing unit 40*g*. In the step S208, the first front and rear limited slip differential torque Tsmcctr is computed by the first front and rear limited slip differential torque computing unit 40*g*. The result depends on x in Eq. (4): if x>0, Tsmcctr=x; and if x≦0, Tsmcctr=0.

In the step S209, the second front and rear limited slip differential torque Tpcctr is computed by the second front and rear limited slip differential torque computing unit 40*h*. Specifically, If εctr>0, Tpcctr=kpctr·εctr; and if εctr≦0, Tpcctr=0.

In the step S210, the summation of Tsmcctr and Tpcctr is carried out by the front and rear limited slip differential torque computing unit 40*i* to give Tlsdctr as in Eq. (5), and then the process flow exits the routine.

In the above step S205, if Δωctr is less than or equal to Δωctrs, it is judged that the front and rear conditions for starting the control are not met, and the process flow goes to the step S211.

In the step S211, Tsmcctr, Tpcctr, and Tlsdctr are all set to 0.

Thereafter, in the step S212, the integral of εctr is reset to 0 by the first front and rear limited slip differential torque computing unit 40*g*, and the process flow exits the routine.

As seen above, according to the present embodiment, when the yaw moment control is operating while the non-operation state of the traction control is selected via the traction control OFF switch 35, the front and rear limited slip differential torque Tlsdctr is assigned with the constant TCH. When either the yaw moment control or the traction control is operating while the operation state of the traction control is selected, Tlsdctr is assigned with the constant TCL, which is smaller than TCH. Therefore, if over steering occurs while the non-operation state of the traction control is selected by the traction control OFF switch 35, the braking force is applied to the front wheel at the outer side of turning by the yaw moment control, the other braking force is applied to the front wheel at the inner side of the turning by the limited slip differential control, and the driving force is applied to the two rear wheels. However, since the front and rear limited slip differential torque of a clutch means, which varies the torque distribution between the front and rear axles via the center differential, is set at a large value, transfer of excess driving force via the center differential from the front wheels to the rear wheels or vice versa will be suppressed. Thus, unstable vehicle behaviors are definitely prevented.

Although, in the present embodiment, the center differential system 3 comprises the compound planetary gears without ring gears, compound planetary gears with ring gears or bevel gears may be utilized.

Furthermore, although, in the present invention, the brake driving unit 51 as the limited slip differential control means operates to apply the target braking force to the wheel with a greater wheel velocity, a limited slip differential system such as a clutch incorporated in the front wheel final reduction device 11 may be utilized.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

We claim:

1. A control device for a four-wheel drive vehicle, comprising:
    a yaw moment control unit for selecting a wheel based on a driving state and generating yaw moment on the vehicle by applying braking force to the selected wheel;
    a driving force control unit for identifying excess driving force based on the driving state and reducing the identified excess driving force;
    a limited slip differential control unit for limiting a differential in velocity between a front right wheel and a front left wheel;
    a front and rear driving force distribution control unit for controlling engagement torque of a clutch unit which varies torque distribution between front and rear axles via a center differential; and
    a switch unit for selecting an operation state or a non-operation state of the driving force control unit,
    wherein
    the front and rear driving force distribution control unit sets the engagement torque of the clutch unit at a value when the yaw moment control unit operates while the driving force control unit is in the non-operation state as selected by the switch unit, the value being greater than that of the engagement torque of the clutch unit when the yaw moment control operates while the driving force control unit is in the operation state as selected by the switch unit.

2. The control device for a four-wheel drive vehicle according to claim 1, wherein the engagement torque of the clutch unit is a predetermined constant when the yaw moment control unit operates while the driving force control unit is in the non-operation state as selected by the switch unit.

3. A control device for a four-wheel drive vehicle, comprising:
    a driving state detecting unit for detecting a driving state of the vehicle;
    a brake unit for braking at least a front wheel;
    a driving source unit for applying a driving force;
    a center differential unit for distributing the driving force between a front and rear axles;
    a clutch unit provided between the front and rear axles for varying the distributed driving force;
    a switch unit arranged to select between an ON state and an OFF state by a driver, and outputting a signal according to the state; and
    a control unit connected to the driving state detecting unit and the switch unit, for controlling the brake unit, the driving source, and the clutch unit,
    wherein
    the control unit determines an under-steering tendency or an over-steering tendency of the vehicle based on the driving state, and controls the brake unit based on the determined steering tendency so as to generate yaw moment on the vehicle;
    the control unit identifies excess driving force based on the driving state, and controls the driving source so as to reduce the identified excess driving force when the outputted signal indicates the ON state;
    the control unit calculates a differential in velocity between the front wheels based on the driving state, and controls the brake unit so as to limit the differential;
    the control unit controls the clutch unit so as to set an engagement torque of the clutch unit at a value when the yaw moment is generated by the brake unit while the outputted signal indicates the OFF state, the value being greater than that of the engagement torque of the clutch unit when the yaw moment is generated by the brake unit while the outputted signal indicates the ON state.

4. The control device for a four-wheel drive vehicle according to claim 3, wherein the engagement torque of the clutch unit is set at a predetermined constant when the yaw moment is generated by the brake unit while the outputted signal indicates the OFF state.

* * * * *